(12) United States Patent
Beatty et al.

(10) Patent No.: US 10,929,911 B2
(45) Date of Patent: Feb. 23, 2021

(54) METHOD AND SYSTEM FOR A REAL ESTATE RECOMMENDATION APPLICATION

(71) Applicant: Carrier Corporation, Palm Beach Gardens, FL (US)

(72) Inventors: Jackson Beatty, Molalla, OR (US);
Debbie Bell, Monmouth, OR (US);
Adam Cooper, Jefferson, OR (US);
Yenong Qi, Salem, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 214 days.

(21) Appl. No.: 16/018,285

(22) Filed: Jun. 26, 2018

(65) Prior Publication Data
US 2019/0005564 A1 Jan. 3, 2019

Related U.S. Application Data

(60) Provisional application No. 62/527,416, filed on Jun. 30, 2017.

(51) Int. Cl.
*G06Q 30/00* (2012.01)
*G06Q 30/06* (2012.01)
(Continued)

(52) U.S. Cl.
CPC ....... *G06Q 30/0629* (2013.01); *G06F 16/487* (2019.01); *G06Q 30/0201* (2013.01);
(Continued)

(58) Field of Classification Search
CPC ........... G06Q 30/0629; G06Q 30/0201; G06Q 30/0627; G06Q 30/0631; G06Q 50/16; G06F 16/487
See application file for complete search history.

(56) References Cited

U.S. PATENT DOCUMENTS 5,361,201 A 11/1994 Jost et al.
6,041,311 A 3/2000 Chislenko et al.
(Continued)

FOREIGN PATENT DOCUMENTS

AU 2017100177 A4 3/2017
CA 2717878 A1 4/2012
(Continued)

OTHER PUBLICATIONS

Listingbook enables house hunters to 'search like an agent', Andrea V. Brambila, Jan. 14, http://www.inman.com/2015/07/10/listingbook-enables-house-hunters-to-search-like-an-agent/, pp. 1-11. (Year: 2015).*
(Continued)

*Primary Examiner* — Matthew E Zimmerman
(74) *Attorney, Agent, or Firm* — Bachman & LaPointe, P.C.

(57) ABSTRACT

A method to provide feedback associated with a real estate property including providing access to a subject real estate property via a system including at least a listing recommendation server that communicates with a real estate feedback application; receiving feedback regarding the subject real estate property from a handheld device operating the real estate feedback application; determining comparable properties in response to the feedback on the subject real estate property.

7 Claims, 11 Drawing Sheets

(51) Int. Cl.
*G06Q 30/02* (2012.01)
*G06F 16/487* (2019.01)
*G06Q 50/16* (2012.01)

(52) U.S. Cl.
CPC ..... *G06Q 30/0627* (2013.01); *G06Q 30/0631* (2013.01); *G06Q 50/16* (2013.01)

(56) References Cited

U.S. PATENT DOCUMENTS

| | | | |
|---|---|---|---|
| 6,472,973 B1* | 10/2002 | Harold | G07C 9/27 340/5.73 |
| 6,609,109 B1 | 8/2003 | Bradley et al. | |
| 6,624,742 B1 | 9/2003 | Romano et al. | |
| 6,883,002 B2 | 4/2005 | Faudman | |
| 6,973,432 B1 | 12/2005 | Woodard et al. | |
| 7,006,977 B1 | 2/2006 | Attra et al. | |
| 7,904,511 B2 | 3/2011 | Ryan et al. | |
| 8,024,349 B1 | 9/2011 | Shao et al. | |
| 8,103,597 B2 | 1/2012 | Arnebeck | |
| 8,140,421 B1 | 3/2012 | Humphries et al. | |
| 8,140,443 B2 | 3/2012 | Fawaz | |
| 8,145,661 B1 | 3/2012 | Billman et al. | |
| 8,244,851 B1 | 8/2012 | Postoaca | |
| 8,478,651 B1 | 7/2013 | Crafts et al. | |
| 8,688,594 B2* | 4/2014 | Thomas | G06Q 50/16 705/314 |
| 8,832,136 B1* | 9/2014 | Billman | G06F 16/9535 707/767 |
| 8,983,927 B2 | 3/2015 | Rao | |
| 9,104,782 B2 | 8/2015 | Visioli et al. | |
| 9,128,471 B1* | 9/2015 | Shahid | G06Q 30/0267 |
| 9,213,461 B2 | 12/2015 | Eraker et al. | |
| 9,361,583 B1 | 6/2016 | Holloway et al. | |
| 2002/0022980 A1* | 2/2002 | Mozayeny | G06Q 10/109 705/5 |
| 2002/0049624 A1 | 4/2002 | Raveis, Jr. | |
| 2002/0072930 A1 | 6/2002 | Scites | |
| 2003/0229649 A1 | 12/2003 | Herrero | |
| 2004/0088172 A1 | 5/2004 | Baglioni | |
| 2005/0182745 A1 | 8/2005 | Dhillon et al. | |
| 2005/0256866 A1 | 11/2005 | Lu et al. | |
| 2006/0080114 A1 | 4/2006 | Bakes et al. | |
| 2006/0282304 A1* | 12/2006 | Bedard | G06Q 30/0601 705/7.33 |
| 2007/0016428 A1 | 1/2007 | Loveland | |
| 2007/0174764 A1 | 7/2007 | Roseway et al. | |
| 2007/0226046 A1* | 9/2007 | Share | G06Q 30/0201 705/7.29 |
| 2008/0109433 A1 | 5/2008 | Rose | |
| 2008/0262902 A1 | 10/2008 | Bullis et al. | |
| 2009/0153291 A1 | 6/2009 | Larson et al. | |
| 2009/0182788 A1 | 7/2009 | Chung et al. | |
| 2009/0192862 A1 | 7/2009 | Hoggard | |
| 2010/0131331 A1 | 5/2010 | Ginsburg et al. | |
| 2011/0066561 A1 | 3/2011 | Lazarre et al. | |
| 2011/0238586 A1 | 9/2011 | Mainville | |
| 2011/0251876 A1 | 10/2011 | Fisher | |
| 2011/0251974 A1 | 10/2011 | Woodard et al. | |
| 2011/0275441 A1* | 11/2011 | Wilson | G06Q 50/16 463/42 |
| 2012/0323587 A1 | 12/2012 | Llosa | |
| 2013/0018957 A1 | 1/2013 | Parnaby et al. | |
| 2013/0254289 A1 | 9/2013 | Cutri et al. | |
| 2013/0325606 A1 | 12/2013 | Balduf et al. | |
| 2013/0325623 A1* | 12/2013 | Balduf | G06Q 30/02 705/14.66 |
| 2013/0346151 A1 | 12/2013 | Bleakley et al. | |
| 2014/0026094 A1* | 1/2014 | Zimmerman | H04W 4/029 715/781 |
| 2014/0136517 A1* | 5/2014 | Li | G06F 16/345 707/722 |
| 2014/0222620 A1* | 8/2014 | Polston | G06Q 50/16 705/26.43 |
| 2014/0266586 A1 | 9/2014 | Fisher et al. | |
| 2014/0279176 A1 | 9/2014 | Taylor et al. | |
| 2014/0279592 A1* | 9/2014 | Ruebush | G06Q 30/06 705/313 |
| 2014/0304178 A1* | 10/2014 | Bengson | G06Q 50/16 705/313 |
| 2014/0375422 A1 | 12/2014 | Huber et al. | |
| 2015/0242919 A1 | 8/2015 | Wickam | |
| 2015/0269689 A1* | 9/2015 | Ferguson | G06Q 50/16 705/313 |
| 2015/0317581 A1 | 11/2015 | Fawaz | |
| 2015/0324941 A1 | 11/2015 | Garg | |
| 2015/0356801 A1* | 12/2015 | Nitu | G07C 9/00904 340/5.61 |
| 2016/0048874 A1 | 2/2016 | Brajer et al. | |
| 2016/0098806 A1 | 4/2016 | Chen et al. | |
| 2016/0117785 A1 | 4/2016 | Lerick et al. | |
| 2016/0189320 A1 | 6/2016 | Oddo | |
| 2016/0267576 A1 | 9/2016 | Crossman Sullivan et al. | |
| 2016/0314545 A1 | 10/2016 | Jessen | |
| 2016/0364929 A1 | 12/2016 | Fisher et al. | |
| 2016/0379321 A1 | 12/2016 | Abraham et al. | |
| 2018/0253780 A1 | 9/2018 | Wang et al. | |
| 2018/0374170 A1 | 12/2018 | Kuenzi et al. | |
| 2019/0005516 A1 | 1/2019 | Spath | |
| 2019/0005557 A1 | 1/2019 | Spath | |

FOREIGN PATENT DOCUMENTS

| | | |
|---|---|---|
| CN | 106446009 A | 2/2017 |
| WO | 0177793 A2 | 10/2001 |
| WO | 2012135932 A1 | 10/2012 |
| WO | 2014018065 A1 | 1/2014 |
| WO | 2014/160806 A1 | 10/2014 |

OTHER PUBLICATIONS

What is the average amount of showings before a house is sold? https://www.trulia.com/voices/Home_Selling/What_is_the_average_amount_of_showings_before_a_ho-709776, Trulia, Jul. 7, 2014, pp. 1-14.

What is the average number of showings before an offer is made? https://www.trulia.com/voices/Home_Selling/What_is_the_average_number_of_showings_before_an_o-23671, Trulia, Feb. 27, 2008, pp. 1-11.

Long Time On Market Makes Moody Sellers?, https://www.redfin.com/blog/2007/09/long_time_on_market_makes_moody_sellers.html, Redfin Blogger, Sep. 20, 2007, pp. 1-3.

Welcome to the First-Ever Redfin Housing Demand Index, Capturing U.S. Homebuyer Demand and Forecasting Home-Price and Sales Trends, Written by Nela Richardson on Jul. 23, 2015, https://www.redfin.com/blog/2015/07/july.html, pp. 1-7.

Redfin Shared Search Makes It Easy for Spouses, Agents and Parents to Work Together on a House Hunt, Glenn Kelman, Apr. 6, 2015, https://www.redfin.com/blog/2015/04/redfin-shared-search-makes-it-easy-for-spouses-agents-and-parents-to-work-together-on-a-house-hunt.html, pp. 1-11.

Sharing Your Favorite Homes Just Got Easier with Trulia's iMessage Extensions, Mili Dutta, Feb. 23, 2017, https://www.trulia.com/blog/tech/trulia-imessage-extensions/, pp. 1-4.

Listingbook enables house hunters to 'search like an agent', Andrea V. Brambila, Jan. 14, http://www.inman.com/2015/07/10/listingbook-enables-house-hunters-to-search-like-an-agent/, pp. 1-11.

U.S. Non-Final Office Action dated May 21, 2020 issued for related U.S. Appl. No. 16/017,358.

U.S. Final Office Action dated Sep. 11, 2020 issued for related U.S. Appl. No. 16/018,288.

U.S. Non-Final Office Action dated May 27, 2020 issued for related U.S. Appl. No. 16/018,290.

Xiwang Yang et al., Circle-based Recommendation in Online Social Networks, eeweb.poly.edu/faculty/yongliu/docs/CircleRec.pdf, Knowledge Discovery and Data Mining, pp. 1-9, 2012.

U.S. Notice of Allowance dated Dec. 1, 2020, issued for related U.S. Appl. No. 16/018,290.

(56) References Cited

OTHER PUBLICATIONS

U.S. Non-Final Office Action dated Nov. 19, 2020 issued for related U.S. Appl. No. 16/018,288.
U.S. Final Office Action dated Nov. 27, 2020 issued for related U.S. Appl. No. 16/017,358.

* cited by examiner

METHOD AND SYSTEM FOR A REAL ESTATE RECOMMENDATION APPLICATION

CROSS-REFERENCE TO RELATED APPLICATIONS

This application claims the benefit of provisional application Ser. No. 62/527,416, filed Jun. 30, 2017.

BACKGROUND

The present disclosure relates generally to a real estate buyer feedback system, and more particularly, to a system and method to make real estate recommendations of comparable properties based on buyer feedback.

In the real estate industry, there exists significant activity relating to the sale of a home that is based on agent knowledge. Typically, home buyers rely upon the expertise of the real estate agent to identify alternate properties that may be of interest to the buyer.

SUMMARY

A method for determining a real estate recommendation according to one disclosed non-limiting embodiment of the present disclosure can include providing access to a subject real estate property via a system including at least a listing recommendation server that communicates with a real estate feedback application; receiving feedback regarding the subject real estate property from the real estate feedback application; comparing feedback associated with the subject real estate property to feedback associated with one or more comparable properties; and recommending one or more real estate properties in response to the feedback on the subject real estate property and the comparable properties.

A further embodiment of the present disclosure may include that the providing access to the real estate property is selectively provided in response to direction from a showing agent associated with the real estate property.

A further embodiment of the present disclosure may include receiving at least one of a picture, a video, and a note from the handheld device operating the real estate feedback application.

A further embodiment of the present disclosure may include receiving a rating from the handheld device operating the real estate feedback application.

A further embodiment of the present disclosure may include that the rating is specific to particular rooms of the subject real estate listing.

A further embodiment of the present disclosure may include determining one or more comparable properties from at least one of a comparable square footage, a comparable price, a comparable location, and a comparable school district.

A further embodiment of the present disclosure may include determining recommended properties from the comparable properties based on the comparing the feedback associated with the subject real estate property to the feedback associated with the comparable properties.

A further embodiment of the present disclosure may include determining a feedback trend associated with the subject real estate property and feedback from another real estate property by the buyer.

A further embodiment of the present disclosure may include comparing the feedback trend associated with the comparable properties.

A further embodiment of the present disclosure may include comprising recommending at least one of the comparable properties.

A system for determining a real estate recommendation according to one disclosed non-limiting embodiment of the present disclosure can include a buyer server hosting a buyer application program interface; a buyer storage system in communication with the buyer server, the buyer storage system including a database that stores buyer feedback; and a listing recommendation server hosting an analytics software application that compares the buyer feedback regarding the subject real estate property with feedback on one or more comparable real estate properties to recommend one or more comparable real estate properties.

A further embodiment of the present disclosure may include that the analytics software application is operable to determine the comparable properties in response to at least one of a comparable sq. footage, a comparable price, a comparable location, and a comparable school district.

A further embodiment of the present disclosure may include a handheld device operating a real estate feedback application to communicate feedback regarding the subject real estate property.

A further embodiment of the present disclosure may include that the analytics software application is operable to determine a feedback trend associated with the subject real estate property.

A further embodiment of the present disclosure may include that the analytics software application is operable to determine feedback trend on the one or more comparable real estate properties.

A further embodiment of the present disclosure may include that the analytics software application is operable to determine a feedback trend associated with the subject real estate property, the trend being weighted by the rooms for which feedback is provided.

A handheld device according to one disclosed non-limiting embodiment of the present disclosure can include a power supply; a memory to store executable instructions for operation of a real estate feedback application; and a processor in communication with the memory and the power supply, the processor operable to execute the executable instructions to upload feedback regarding a subject real estate property via the real estate feedback application and receive recommended properties in response to the feedback on the subject real estate property.

A further embodiment of the present disclosure may include uploading the feedback to a buyer storage system through a buyer application program interface hosted on a buyer server.

A further embodiment of the present disclosure may include uploading the feedback associated with a specific room of the subject real estate listing in memory via the real estate feedback application, the specific area of the real estate listing determined by a GPS module in the handheld device.

A further embodiment of the present disclosure may include that the recommended properties are displayed on the handheld device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
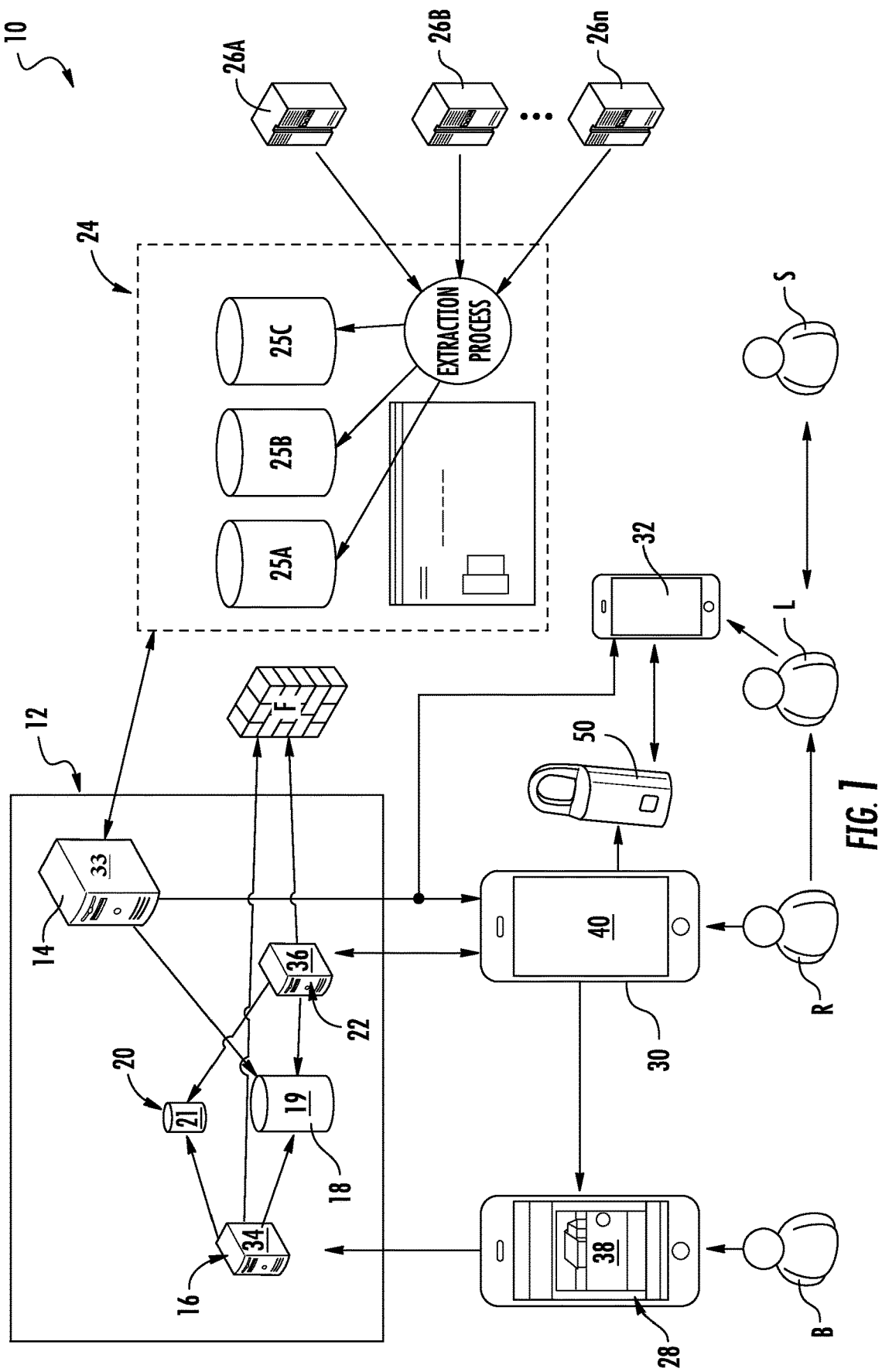
FIG. 1 is a general schematic system diagram of a real estate feedback application system.

FIG. 1 schematically illustrates a system 10 to facilitate communication for real estate transactions. A property buyer "B" is typically represented by a showing agent "R" while a property seller "S" is typically represented by a listing agent "L." The listing agent "L" communicates with the buyer "B" only indirectly, such as by communication with the showing agent "R" who then communicates information with the buyer "B." Although only particular agents are referred to in the illustrated embodiments, the functions of such personnel may be otherwise assigned or rearranged. For example, the listing agent "L" may be a senior person in an agency who utilizes a seller's assistant. The showing agent "R" may similarly utilize a showing assistant.

The system 10 generally includes a subsystem 12 that may be controlled by a single owner. The subsystem 12 generally includes a listing recommendation server 14, a buyer server 16, a buyer storage system 18, a log storage system 20, and an electronic key server 22. The listing recommendation server 14 communicates with the buyer storage system 18, the log storage system 20, and a storage system 24. The buyer storage system 18 includes a database 19 that stores, for example, feedback created by the buyer "B" (e.g., buyer feedback, third party feedback, etc.). The log storage system 20 includes a database 21 that collects activity data associated with the property showings.

The storage system 24 may include, but not be limited to, a database for managing key holders 25A, a security database 25B that hosts security protocols, and a listing database 25C that stores extracted property data from external databases 26A, 26B, 26N. The storage system 24 communicates with the external databases 26A-26N such as the Real Estate Transaction Standard (RETS) framework that stores MLS data. Communication between the various servers may include internet protocols or the like. The MLS data may include information such as number of bedrooms, number of bathrooms, price of listing, etc. RETS is a framework that can be adopted by computer systems to receive data from the Multiple Listing Service (MLS) servers, as well as those of other real estate systems provided they also have software installed designed to communicate using the RETS framework. The national association of realtors refers to RETS as a "common language."

A multiple of handheld devices 28, 30, 32, may communicate with the subsystem 12. For example, the handheld devices 28, 30, 32, may be a smartphone, tablet, or other mobile device of the respective individual. Handheld device 28 is used by the potential buyer "B," handheld device 30 is used by the showing agent "R," and handheld device 32 is used by the listing agent "L.

Information is accessible by the listing agent "L" through the subsystem 12 so that the listing agent "L" can, for example, generate reports for their seller "S," send updates about a particular listing to showing agents "R", or provide feedback from a buyer "B" to their seller "S." The subsystem 12 may also obtain information from a Real Estate Transaction Standard (RETS) framework that stores MLS data. The subsystem 12 may also obtain information generated by an electronic key box 50 that occurs as a consequence of the showing, such as number of times shown, time spent at the subject property for each showing, return showings, etc. The subsystem 12 may also be used by the listing agents "L" to receive automatic notification (e.g., email notices) when a showing occurs at their listings. The subsystem 12 may also be used by the buyer "B" as a repository for information (e.g., details of each property the buyer has viewed, feedback on the properties, etc.). The seller "S" can also receive feedback from the buyer "B" either directly from the subsystem 12, or through communications with the listing agent "L" who communicates with the subsystem 12.

The listing recommendation server 14 hosts, for example, at least an analytics software application 33 that compiles and runs analytics against buyer ratings and MLS listing data from the storage system 24. The buyer server 16 hosts a buyer application program interface (API) 34, and the electronic key server 22 hosts an electronic key API 36. An application program interface (API) may include a set of routines, protocols, and/or tools for building software applications. The API specifies how software components should interact. APIs are used when programming graphical user interface (GUI) components. A server-side web API is a programmatic interface with one or more publicly exposed endpoints to a defined request-response message system.

The listing recommendation server 14 may communicate with a real estate application 38 on the handheld device 28 through the buyer API 34. An agent application 40 on the handheld device 30 may communicate with the listing recommendation server 14 and the electronic key server 22. The buyer API 34 and the electronic key API 36 may also communicate with other external systems through a firewall "F."

The real estate application 38 may be a mobile application on the handheld device 28 that may be used by the buyer "B" to rate the properties they have seen. The real estate application 38 communicates with the buyer storage system 18 through the buyer API 34 which then stores the feedback, ratings, and notes taken by the property buyer in the database 19 of the buyer storage system 18.

The agent application 40 may be a mobile application on the handheld device 30 that may be used by the showing agent "R" to access the electronic key boxes 50 via a short distance communication standard (e.g., BLUETOOTH®). Alternatively, or in addition, the electronic key boxes 50 may be connected (e.g., cellular) directly to the listing recommendation server 14. The electronic key API 36 of the electronic key server 22 communicates with the agent application 40 to sync activity information from the electronic key boxes 50 to the electronic key API 36 (e.g., accessed key boxes, update the count of proprietary keys generated for that particular property, create a timestamp indicating that lockbox is opened), and showing notifications (e.g., to an associated showing agent "R").

Figure 2:
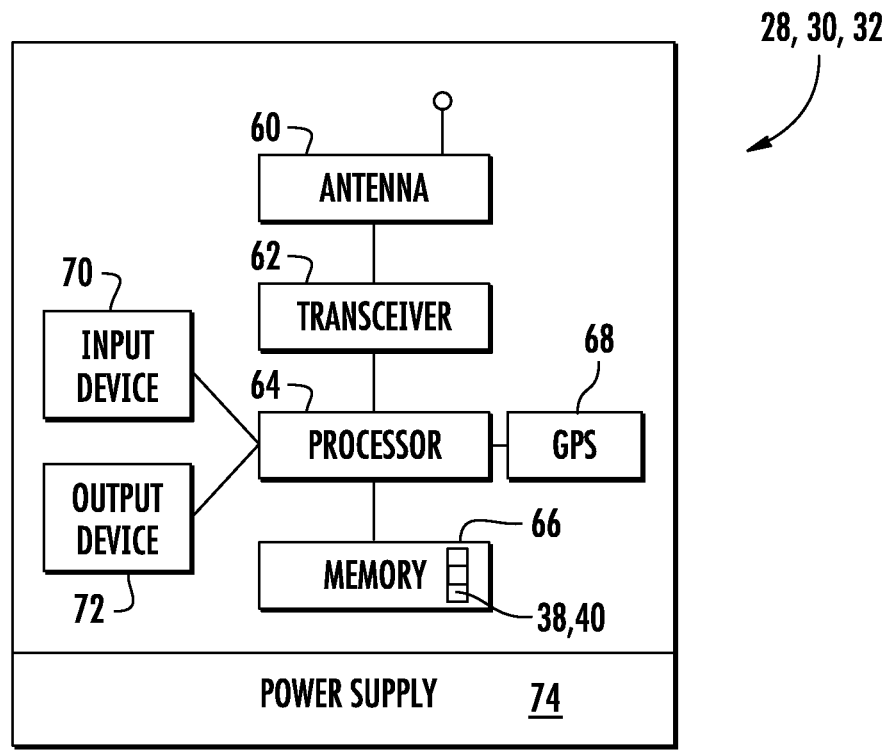
FIG. 2 is a schematic diagram of a handheld device.

With reference to FIG. 2, each handheld device 28, 30, 32, generally includes a handheld device antenna 60, a handheld device transceiver 62, a handheld device processor 64, a handheld device memory 66, a GPS module 68, an input device 70, a display 72, and a handheld device power supply 74. The handheld device processor 64 may be any type of microprocessor having desired performance characteristics. The handheld device memory 66 may include any type of computer readable medium that stores the data and executable instructions described herein below. The executable instructions may be stored or organized in any manner and at any level of abstraction, such as in connection with one or more applications, processes, routines, procedures, methods, etc. The handheld device transceiver 62 is a transceiver of a type corresponding to the transceiver 62 and the handheld device antenna 60 is a corresponding antenna.

Figure 3:
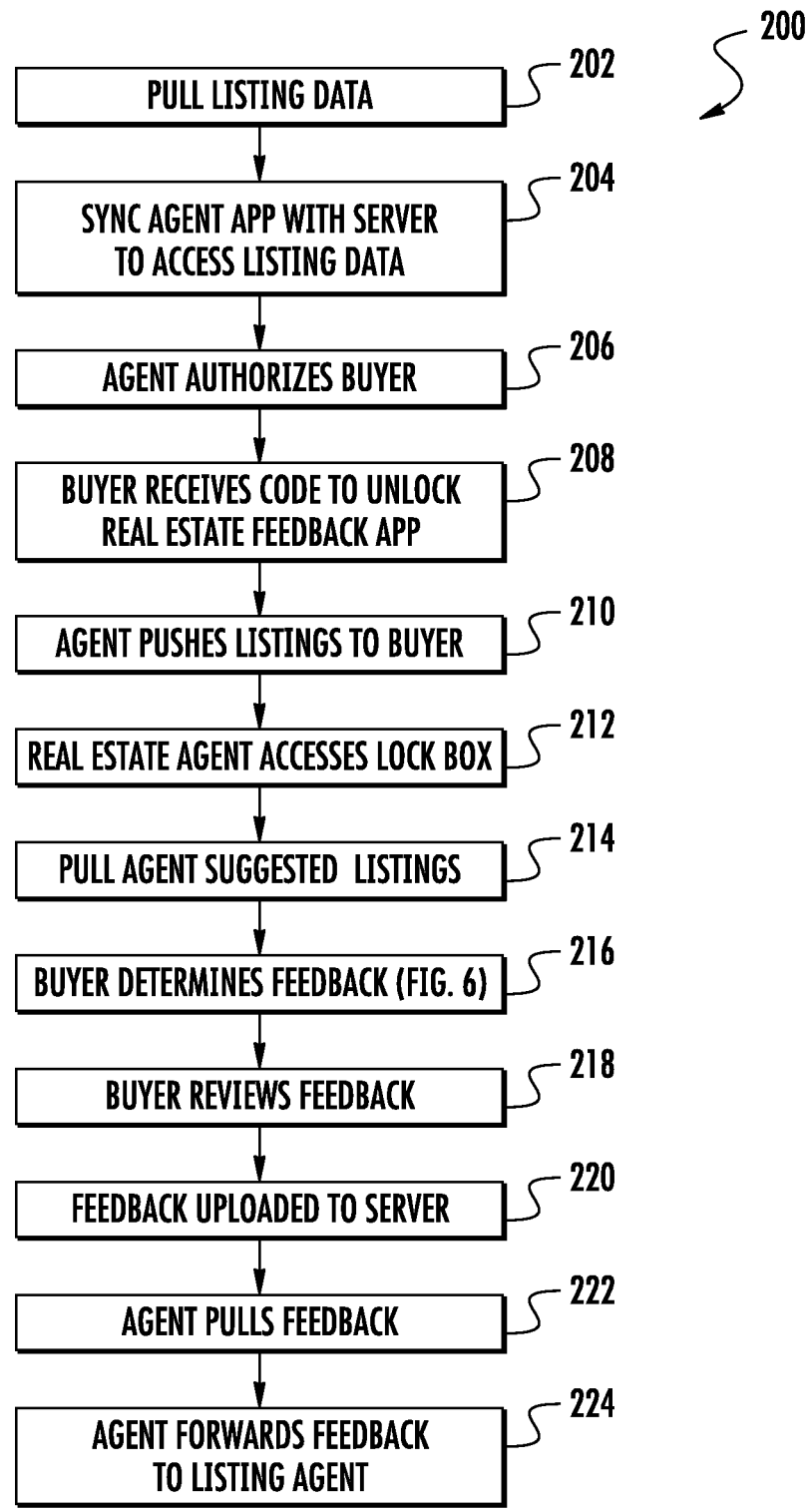
FIG. 3 is a flowchart of a method to provide feedback for real estate, with the system of FIG. 1.

With reference to FIG. 3, a method 200 for operation of the system 10 is disclosed in terms of functional block diagrams. The functions are programmed software routines capable of execution in various microprocessor based electronics control embodiments and represented herein as block diagrams.

Initially, the owner of the subsystem 12 may have agreements with MLS to selectively extract (202) data such as MLS data from the external data servers 26A-26N (FIG. 1) through the listing recommendation server 14. Next, the agent application 40 syncs (204) with the listing recommendation server 14 and pulls MLS data for desired property listings of interest to the buyer "B" as, for example, selected by the showing agent "R." This may be performed through an automated sync through the agent application 40. The showing agent "R" may also perform a manual sync to obtain the MLS data.

Through the agent application 40, the showing agent "R" can then authorize (206) the property buyer "B" to access the desired property listings of interest to the buyer "B." Through the agent application 40, the showing agent "R" may, for example, authorizes the buyer "B" through input of buyer identification information (e.g., buyer name and email address.) The buyer identification information is then communicated to the listing recommendation server 14 so that the listing recommendation server 14 communicates the buyer "B" (e.g., via email to provide a link to an app store) with a code to unlock (208) the real estate application 38. The buyer "B" is then authorized to download the real estate application 38 and the desired property listings of interest to the buyer "B," to maintain the value of the showing agent "R" in the real estate transaction. Alternatively, the buyer "B" already has the real estate application 38 and the desired property listings of interest to the buyer "B" are readily received.

Figure 4:
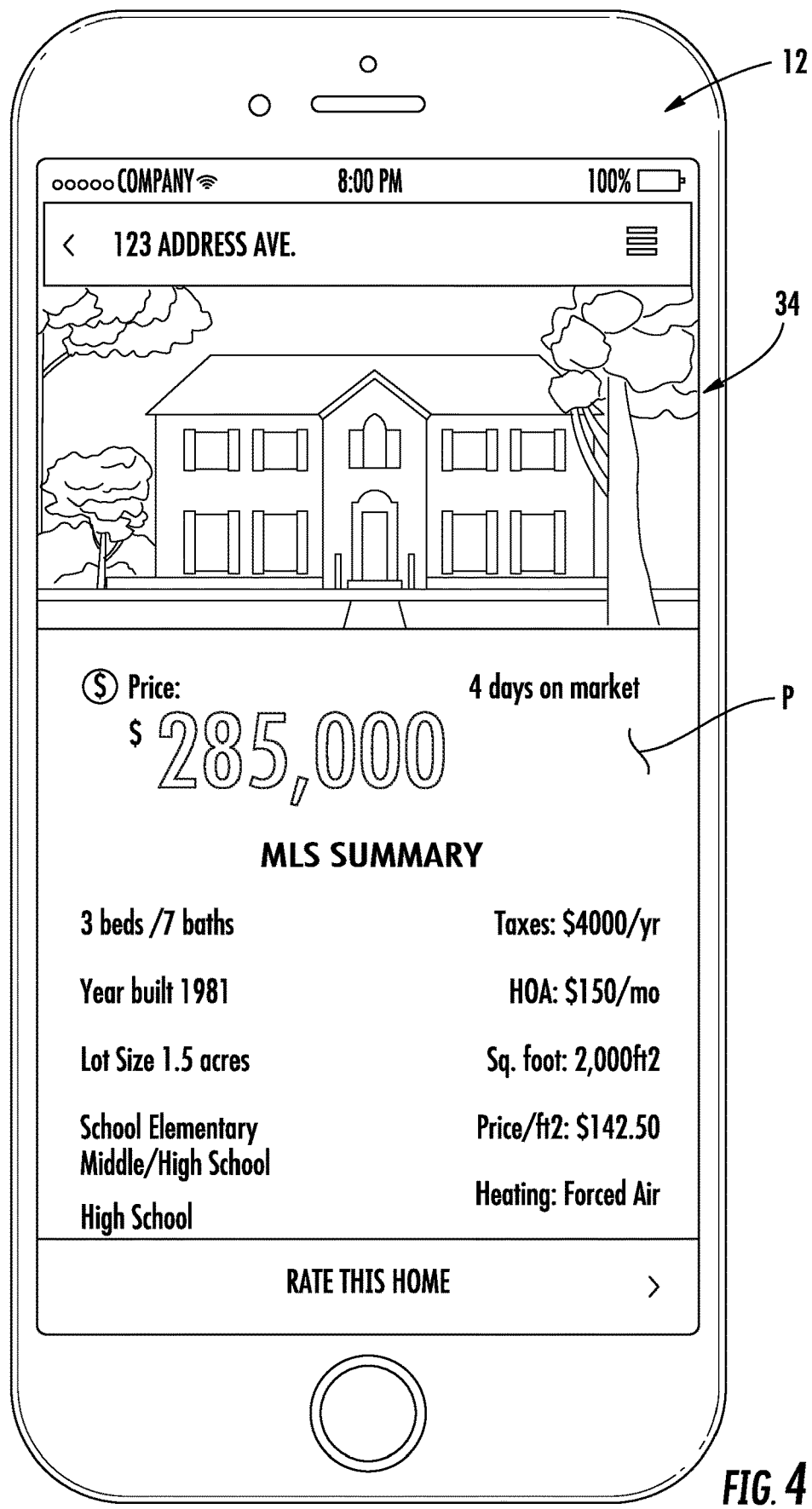
FIG. 4 is a screenshot of the real estate feedback application property listing view.

Through the agent application 40, the showing agent "R" can continue to push (210) property listings to the real estate application 38. Access may be provided for one or more properties by a showing code, or other information that unlocks one or more modules in the real estate application 38. The modules may include features or other aspects that are particular tailored to certain parties in the real estate transaction. The showing agent "R" is able to selectively push the desired property listings of interest to the buyer "B" (one example property listing illustrated by screenshot "P"; FIG. 4) through the subsystem 12 to be viewable within the real estate application 38. The showing agent "R" also uses the agent application 40 to operate the electronic key box 50 to access the property for showing to the buyer "B."

Figure 5:
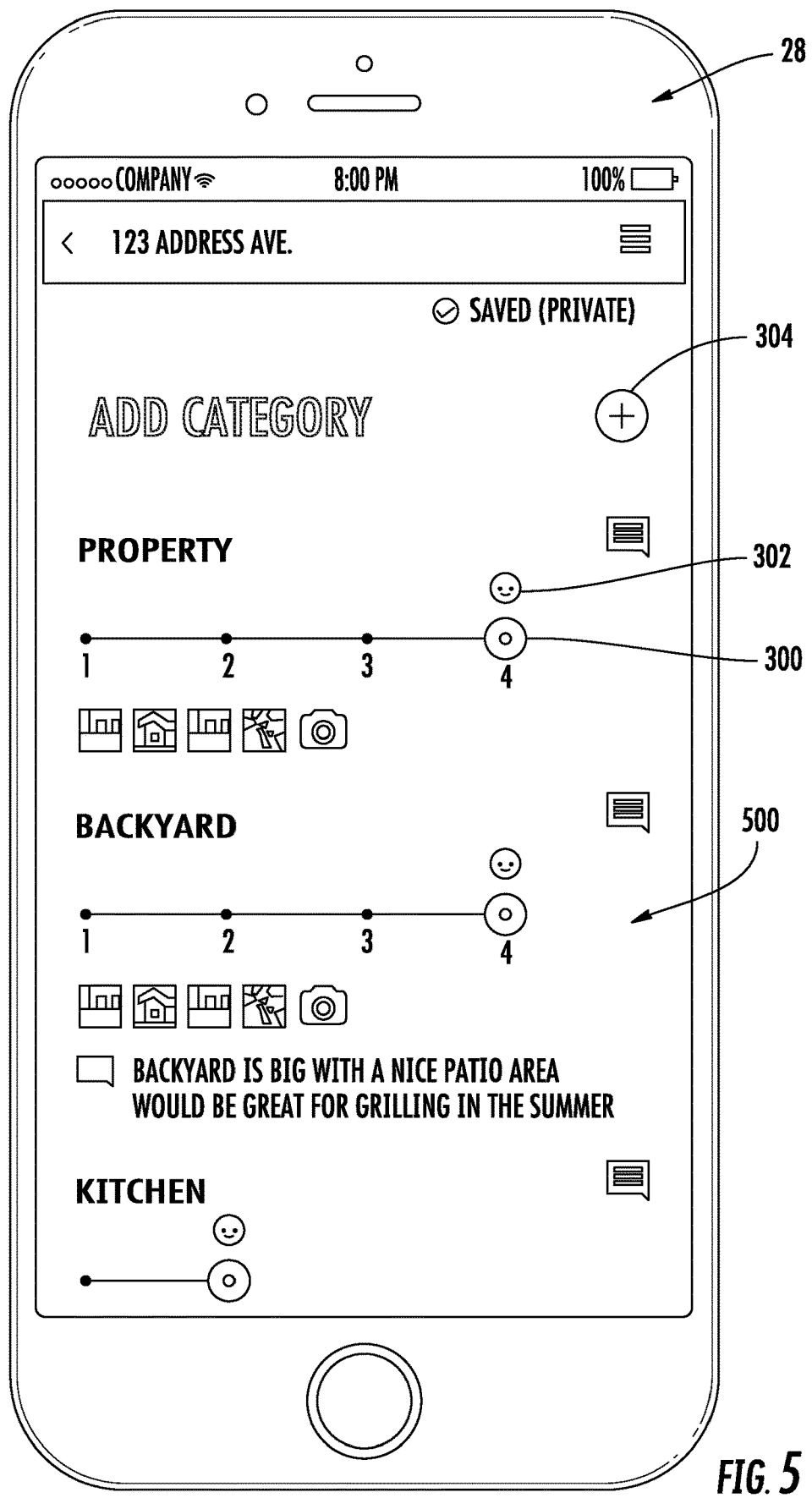
FIG. 5 is a screenshot of the real estate feedback application feedback view.
Figure 6:
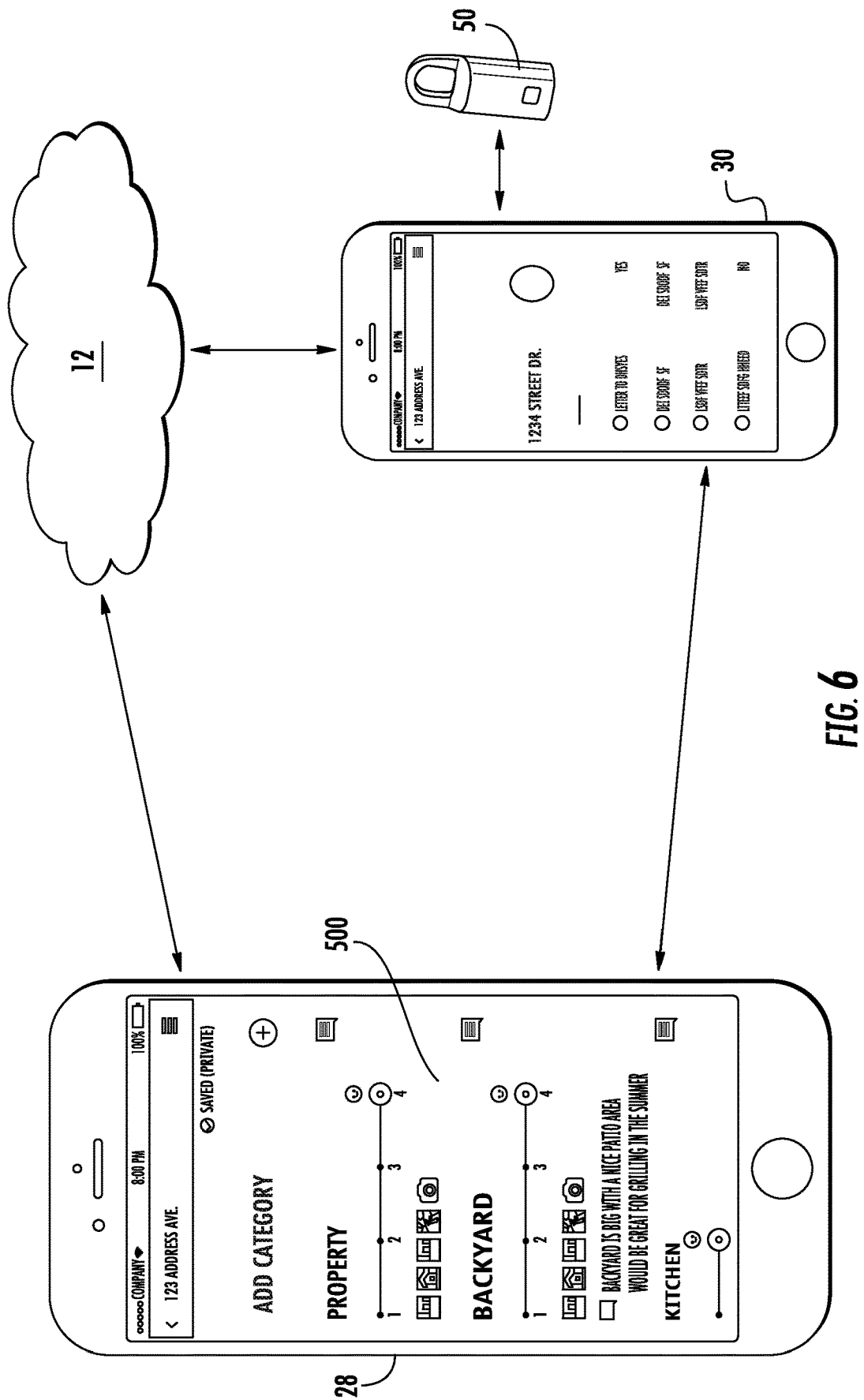
FIG. 6 is a schematic diagram of a system to provide feedback for real estate which is a portion of the system of FIG. 1.

Next, during the showing, feedback is entered into the real estate feedback application 500 by the buyer "B" for the property (216; FIG. 5 and FIG. 6) as further discussed below. The feedback may include any data associated with the properties that may, for example, facilitate reviewing and comparing properties. The real estate feedback application 500 may be a module of the real estate application 38, and/or other application.

In addition to the features discussed above, the buyer "B" can utilize the real estate feedback application 500 to record feedback for each property visited. In one or more embodiments, the buyer "B" can take pictures, videos, and/or notes during the property showing. In one or more embodiments, the feedback may be provided as a scale rating (FIG. 5). For example, the scale rating may be numeric 300 (e.g., 1-10), emoji based 302 (e.g., happy face, sad face), color coded (e.g., red, yellow, green), or other such ranking. Further, the rating may be specific to particular areas of the property, (e.g., backyard, kitchen, etc.) and/or features, (e.g., appliances, fixtures, etc.). In one or more embodiments, the buyer "B" is prompted for feedback. In one or more embodiments, the buyer is prompted for feedback based on the location of the buyer within the property (e.g., via global positioning of the buyer within the property by way of the GPS module 68 (FIG. 2)) such that when the buyer enters, for example, the kitchen, the real estate feedback application 500 prompts the buyer for feedback on the kitchen, etc. In one or more embodiments, the buyer can add a category 304 to provide feedback thereon (e.g., garage).

The feedback is then saved in memory 66 (FIG. 2) via the real estate feedback application 500 so that the buyer can review at a later time (218). The feedback can also be used to compare properties reviewed by the buyer. As the buyer generates feedback about the property, the real estate feedback application 500 may also upload the feedback to the buyer storage system 18 via the buyer API 34 (220; FIG. 1).

Once the showing is complete, the feedback is automatically communicated to the showing agent "R" via the real estate feedback application 500 which authorizes the listing recommendation server 14 to communicate the feedback from the buyer storage system 18. Alternatively, once the showing is complete, the buyer "B" can choose to share the feedback with their showing agent "R" via the real estate feedback application 500 which, in response, authorizes the listing recommendation server 14 to release the feedback from the buyer storage system 18. The agent application 40 then syncs with the listing recommendation server 14 and downloads the feedback (222). The showing agent "R" is then able to review the feedback on the agent application 40. In one or more embodiments, the feedback may be forwarded through an email app, text messaging app, social media, or other app on the handheld device 30 to third parties such as friends and family of the buyer "B."

Through the agent application 40, the showing agent "R" can communicate the feedback to the listing agent "L" (224). In one or more embodiments, the feedback may be forwarded through an email app, text messaging app, social media, or other app on the handheld device 30, and need not be through the subsystem 12. For example, an email app resident on the handheld device 30 is called by the agent application 40, and the feedback is automatically copied into the email by the agent application 40. The showing agent "R" may then edit the email prior to sending the feedback to the listing agent "S."

Figure 7:
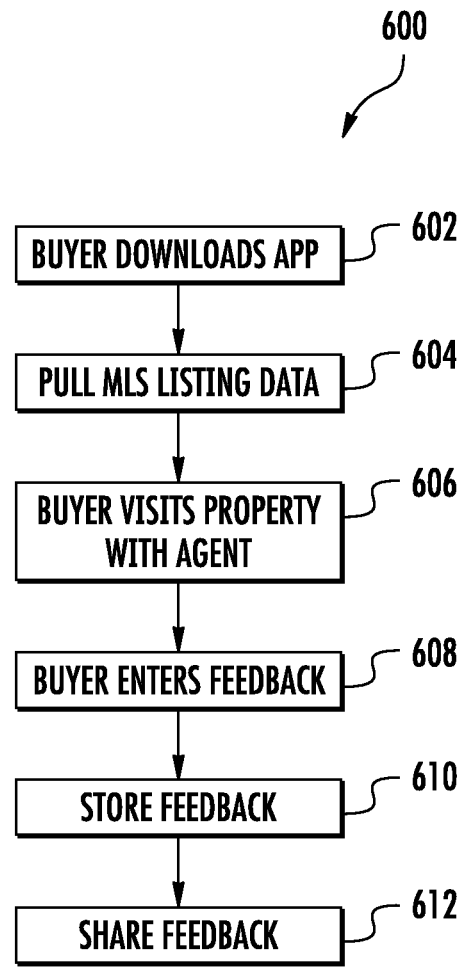
FIG. 7 is a flowchart to provide feedback from a buyer's handheld device.

With reference to FIG. 7, a method 600 for providing feedback via the real estate feedback application 500 from the perspective of the buyer "B" is disclosed in terms of functional block diagrams. The functions are programmed software routines and executable instructions capable of execution in various microprocessor based electronics control embodiments and represented herein as block diagrams.

Initially, the buyer "B" downloads (602) the real estate feedback application 500 from a source such as an app store. The real estate feedback application 500 communicates (604) with the listing recommendation server 14 via the buyer API 34 to pull the agent selected MLS listings. The showing agent "R" then typically escorts the buyer "B" for a showing of particular properties selected by the buyer (606). Next, during the showing, the buyer "B" enters (608; FIG. 5) the feedback into the real estate feedback application 500. The real estate feedback application 500 then saves the feedback for retrieval at a later time (610). The buyer "B" can then utilize the real estate feedback application 500 to review the feedback and compare notes on the properties.

Figure 8:
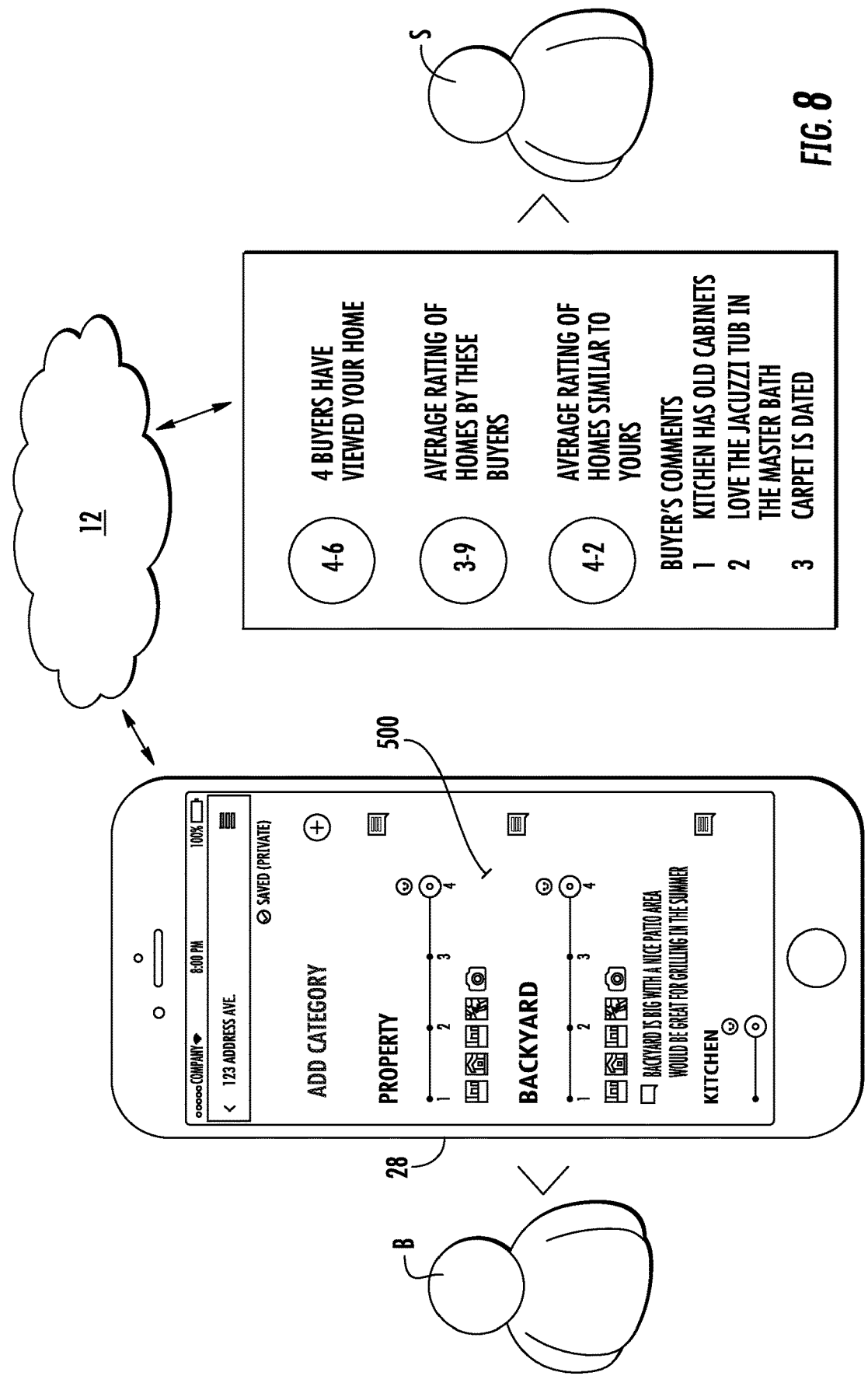
FIG. 8 is a schematic block diagram of feedback provided from a buyer's handheld device to a seller.

Once the showing is complete, the buyer can choose to share the ratings with their showing agent "R" (612). If they so choose, the real estate feedback application 500 will send a message to the listing recommendation server 14 though the buyer API 20 to release the ratings to the showing agent "R." The feedback may be provided to the listing agent "L" through the subsystem 12. In this embodiment, the real estate feedback application 500 uploads the feedback data from the buyer database 18 to the electronic key server 22 via the buyer API 34 which then generates a report for the listing agent "L" (FIG. 8). The feedback report may include, but is not limited to, the buyer's feedback on the subject property, the buyer's feedback on the subject property compared to other properties, the buyer's interest in the subject property compared to other buyers' interest in the subject property by other buyers, other properties which may be comparable to the subject property based on the buyer's feedback, etc.

Figure 9:
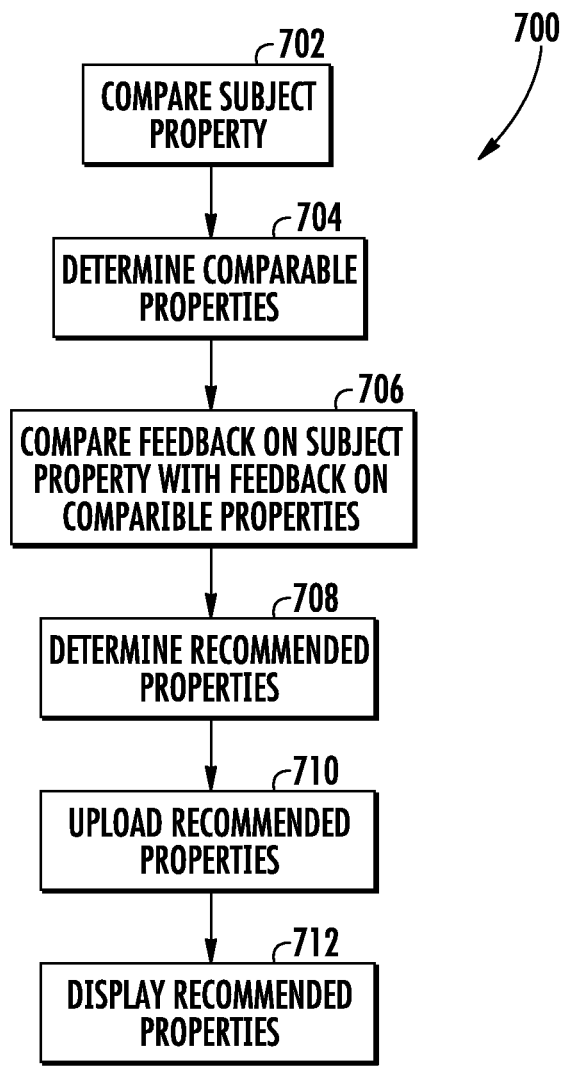
FIG. 9 is a flowchart to determine recommended properties from buyer feedback.

With reference to FIG. 9, a method 700 for providing recommended properties is disclosed in terms of functional block diagrams. The functions are programmed software routines and executable instructions capable of execution in various microprocessor based electronics control embodiments and represented herein as block diagrams.

Once the feedback data is uploaded to the buyer database 18, the listing recommendation server 14 compares (702) the subject property (e.g., the property recently shown to the buyer "B") to other properties in the listing database 25C. The listing recommendation server 14 then determines (704) comparable properties (e.g., sq. footage, price, location, school district, etc.) The comparable properties then from a subset of comparable properties.

The feedback on the subject property is then compared (706) to the feedback on the comparable properties to determine recommended properties (708). For example, a recommended property may be one that received similar feedback ratings by the buyer "B" to similar feedback rating on the same features on a comparable property by another buyer; a high rating on a feature for a comparable property that the buyer "B" rated low on the subject property, comparable properties that have high ratings on features that the buyer "B" has rated as important, etc. Other such relationships may also be used to determine a recommended property.

Figure 10:
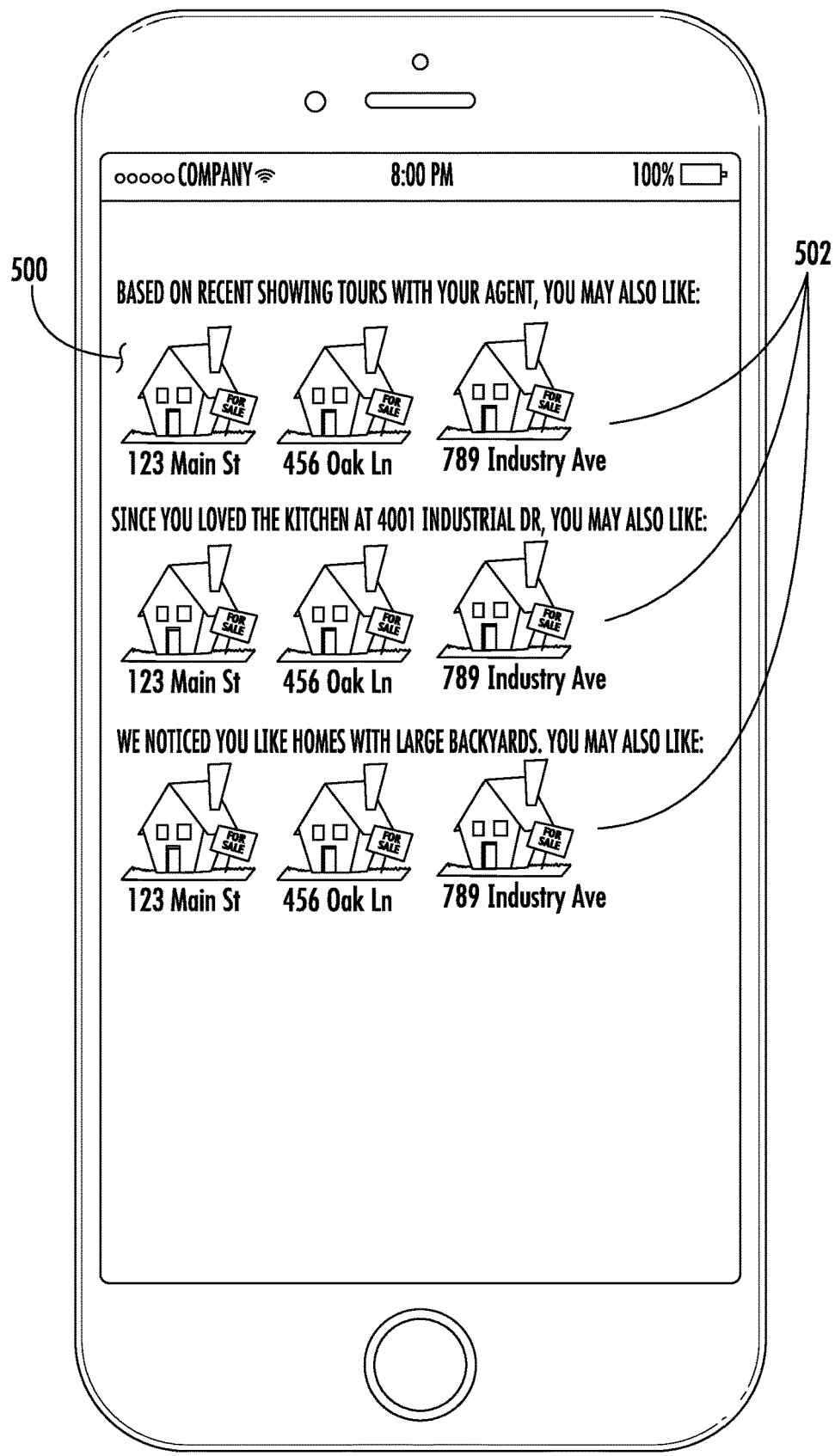
FIG. 10 is a screenshot of a real estate feedback application.

The listing recommendation server 14 then uploads (710) the recommended properties to the database 19 of the buyer database system 18 for access by the buyer "B" through the buyer API 34 via the real estate feedback application 500. The real estate feedback application 500 then displays (712) the recommended properties 502 (FIG. 10). For example, the recommended properties 502 may be based on recent showings selected by the buyer "B," specific feedback (e.g., high kitchen ratings, large backyards, etc.), or other metrics.

Figure 11:
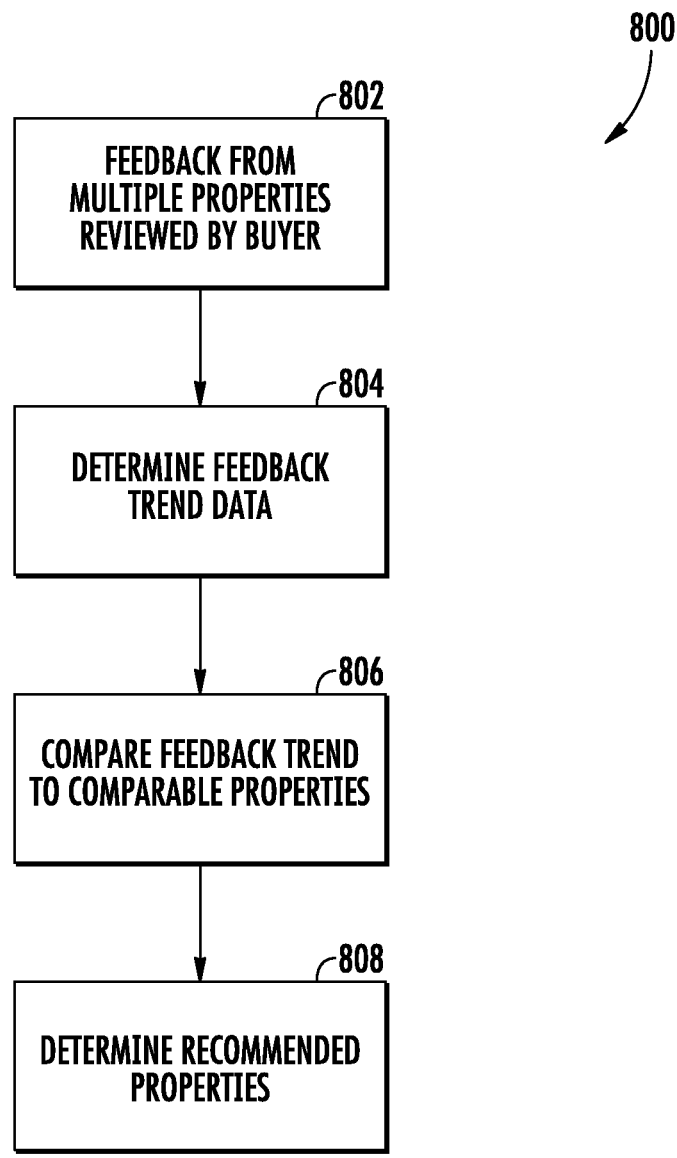
FIG. 11 is a flowchart to determine trends from buyer feedback.

With reference to FIG. 11, a method 800 for determining feedback trends for the buyer "B" is disclosed in terms of functional block diagrams. Although a single subject property may be used as a baseline for comparison to the comparable properties as described above, the buyer "B" is typically shown multiple properties and thereby has generated feedback for each of the multiple of properties.

The listing recommendation server 14 may then utilize (802) the feedback from each of the multiple of properties to determine a feedback trend (804). For example, the buyer "B" may repeatedly give high ratings to properties with large backyards, modern kitchens, etc. The feedback trend on the subject is then compared (806) to the feedback on the comparable properties to determine recommended properties (808) as described above.

In one or more embodiments, the feedback trend data may alternatively be an average of a rating given by the buyer "B" to the subject properties such that a weight is determined for comparison. For example, a buyer that frequently provides feedback on the kitchen but minimal feedback on the living room may be used to increase the weight of importance to high kitchen feedback. Another embodiment may recommend properties in the same geographic area as the subject property irrespective of feedback for the subject property.

The term "server" conveys its customary meaning that provides service and/or data connection, e.g., to the handheld device and/or an electronic locking device. The term "handheld device" refers to a portable electronic device that is at least configured to send messages to, and/or receive messages from the listing recommendation server 14 over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. In addition, the handheld device is typically also configured for short-range wireless communications.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method for determining a real estate recommendation, comprising:
    providing access to a subject real estate property in response to direction from a showing agent associated with the subject real estate property via a system including at least a listing recommendation server that communicates with a real estate feedback application, the listing recommendation server hosting an analytics software application that determines a set of comparable buyers from the buyers stored in a buyer storage system in communication with a buyer server and an electronic key server, the buyer storage system including a database that stores feedback of buyers from the electronic key server, the electronic key server including a database that stores showing data associated with an electronic key box;
    receiving feedback regarding the subject real estate property from the real estate feedback application that comprises receiving a rating from a handheld device operating the real estate feedback application, the rating specific to particular rooms of the subject real estate listing;
    determining comparable properties from at least one of a comparable square footage, a comparable price, a comparable location, and a comparable school district;
    determining a feedback trend weighted by rooms for which feedback is provided for the subject real estate property;
    comparing the feedback trend associated with the subject real estate property to feedback associated with one or more comparable properties;
    determining recommended properties from the one or more comparable properties based on the feedback trend;
    communicating the recommended properties to a handheld device running the real estate feedback application; and
    connecting the electronic key box to the listing recommendation server and logging information with the listing recommendation server about the subject real estate property.

2. The method as recited in claim 1, wherein the receiving feedback regarding the real estate property includes receiving at least one of a picture, a video, and a note from the handheld device operating the real estate feedback application.

3. A system for determining a real estate recommendation, comprising:
    an electronic key box;
    an electronic key server in communication with the electronic key box, the electronic key server including a database that stores showing data associated with the electronic key box;
    one or more computer processors configured with executable instructions to perform the following steps:
        providing access to a subject real estate property in response to direction from a showing agent associated with the subject real estate property via a system including at least a listing recommendation server that communicates with a real estate feedback application, the listing recommendation server hosting an analytics software application that determines a set of comparable buyers from the buyers stored in a buyer storage system in communication with a buyer server, the buyer storage system including a database that stores feedback of buyers from the electronic key server;
        receiving feedback regarding the subject real estate property from the real estate feedback application that comprises receiving a rating from a handheld device operating the real estate feedback application, the rating specific to particular rooms of the subject real estate listing;
        determining comparable properties from at least one of a comparable square footage, a comparable price, a comparable location, and a comparable school district;
        determining a feedback trend weighted by rooms for which feedback is provided for the subject real estate property;
        comparing the feedback trend associated with the subject real estate property to feedback associated with one or more comparable properties;
        determining recommended properties from the one or more comparable properties based on the feedback trend;
        communicating the recommended properties to a handheld device running the real estate feedback application.

4. The system as recited in claim 3, wherein the feedback trend comprises identification of multiple high ratings in particular rooms of the subject property.

5. The system as recited in claim 3, wherein the feedback trend is an average of a rating given by the buyer to the subject properties such that a weight is determined for comparison.

6. The method as recited in claim 1, wherein the feedback trend comprises identification of multiple high ratings in particular rooms of the subject property.

7. The method as recited in claim 1, wherein the feedback trend is an average of a rating given by the buyer to the subject properties such that a weight is determined for comparison.

\* \* \* \* \*